United States Patent
Konik et al.

(10) Patent No.: US 10,325,304 B2
(45) Date of Patent: Jun. 18, 2019

(54) PERSONALIZING ALTERNATIVE RECOMMENDATIONS USING SEARCH CONTEXT

(71) Applicant: eBay Inc., San Jose, CA (US)

(72) Inventors: Tolga Konik, Menlo Park, CA (US); Rajyashree Mukherjee, Fremont, CA (US); Jayasimha Katukuri, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 886 days.

(21) Appl. No.: 14/714,105

(22) Filed: May 15, 2015

(65) Prior Publication Data
US 2015/0339756 A1    Nov. 26, 2015

Related U.S. Application Data

(60) Provisional application No. 62/002,459, filed on May 23, 2014.

(51) Int. Cl.
*G06Q 30/00*    (2012.01)
*G06Q 30/06*    (2012.01)
*G06F 16/332*    (2019.01)

(52) U.S. Cl.
CPC ..... *G06Q 30/0631* (2013.01); *G06F 16/3325* (2019.01)

(58) Field of Classification Search
None
See application file for complete search history.

(56) References Cited

U.S. PATENT DOCUMENTS

| | | | | |
|---|---|---|---|---|
| 5,619,709 | A * | 4/1997 | Caid | G06F 17/30265 704/9 |
| 5,778,362 | A * | 7/1998 | Deerwester | G06F 17/30634 |
| 6,629,097 | B1 * | 9/2003 | Keith | G06F 17/30598 |
| 8,001,152 | B1 * | 8/2011 | Solan | G06F 17/2785 707/791 |
| 8,078,617 | B1 * | 12/2011 | Neveitt | G06Q 30/00 707/732 |

(Continued)

OTHER PUBLICATIONS

Alexandridis; "Improving Social Recommendations by applying a Personalized Item Clustering policy"; 2013; School of Electrical and Computer Engineering National Technical University (Year: 2013).*

(Continued)

*Primary Examiner* — Jason B Dunham
*Assistant Examiner* — Norman Donald Sutch, Jr.
(74) *Attorney, Agent, or Firm* — Shook, Hardy & Bacon L.L.P.

(57) ABSTRACT

Aspects of the present disclosure include a system comprising a computer-readable storage medium storing at least one program and a computer-implemented method for providing alternative recommendations using search context. Consistent with some embodiments, the method may include receiving a user search query and receiving a request to view an item included in a set of search results retrieved in response to the search query. The method may further include determining an alternative item recommendation using the search query and attributes of the item, and causing presentation of the item and the alternative item recommendation in response to receiving the request to view the item.

18 Claims, 7 Drawing Sheets

(56) References Cited

U.S. PATENT DOCUMENTS

| | | | | |
|---|---|---|---|---|
| 8,781,916 B1* | 7/2014 | Buryak | G06Q 30/0631 | 705/26.7 |
| 2003/0105682 A1* | 6/2003 | Dicker | G06Q 30/02 | 705/26.8 |
| 2010/0223258 A1* | 9/2010 | Ghahramani | G06F 17/30247 | 707/723 |
| 2011/0305374 A1* | 12/2011 | Chou | G06F 17/30259 | 382/118 |
| 2012/0095975 A1* | 4/2012 | Billingsley | G06F 17/30864 | 707/705 |
| 2012/0323953 A1* | 12/2012 | Ortega | G06F 17/30997 | 707/767 |
| 2013/0282519 A1* | 10/2013 | Xavier | G06Q 30/0631 | 705/26.7 |

OTHER PUBLICATIONS

Amatriain, Xavier, "Mining Large Streams of User Data for Personalized Recommendations", SIGKDD Explorations. vol. 14, Issue. 2., (2012), 37-48.

Anand, S. S, et al., "Contextual Recommendation", From Web to Social Web: Discovering and Deploying User and Content Profiles, Lecture Notes in Computer Science, vol. 4737, (2007), 142-160.

Baltrunas, Linas, et al., "Matrix factorization techniques for context aware recommendation", RecSys'11, Oct. 23-27, 2011, Chicago, Illinois, USA, (2011), 301-304.

Das, Abhinandan S, et al., "Google news personalization: scalable online collaborative filtering", Proceedings of the 16th International Conference on World Wide Web, (2007), 271-280.

Davidson, James, et al., "The YouTube Video Recommendation System", Proceedings of the fourth ACM conference on Recommender systems. 2010, ACM: Barcelona, Spain, (2010), 293-296.

Katukuri, Jayasimha, et al., "Large-scale Recommendations in a Dynamic Marketplace", LSRS-2013, (2013), 1-4.

Koren, Y., "Factorization meets the neighborhood: a multifaceted collaborative filtering model", KDD'08, Aug. 24-27, 2008, Las Vegas, Nevada, USA, (2008), 426-434.

Linden, G., et al., "Amazon.com recommendations: item-to-item collaborative filtering", IEEE Internet Computing, 7(1), (Jan.-Feb. 2003), 76-80.

* cited by examiner

PERSONALIZING ALTERNATIVE RECOMMENDATIONS USING SEARCH CONTEXT

PRIORITY CLAIM

This application is a non-provisional application of, and claims the benefit of priority under 35 U.S.C. § 119(e) from U.S. Provisional Application Ser. No. 60/002,459, entitled "PERSONALIZING ALTERNATIVE RECOMMENDATIONS USING SEARCH CONTEXT," filed on May 23, 2014, which is hereby incorporated by reference.

TECHNICAL FIELD

This application relates to data processing. In particular, example embodiments relate to systems and methods for providing alternative recommendations using search context.

BACKGROUND

At e-commerce websites, primary means of navigation involve user initiated activities like browsing a category, searching by entering keywords, or filtering search results by selecting values for a set of attributes a system provides. These actions often require users to understand an ontology used in organizing an inventory to guess keywords that may lead to desired results. This process may be frustrating for users who are not familiar with content of the site or for users who only have a general sense of what they are looking for.

Recommendations provide an alternative approach to assist users in accessing relevant content. Unlike search engines that aim to answer user-formulated queries, recommendation engines provide content without requiring direct user input. Instead, conventional recommendation engines use inferred user interest to identify and provide content. These conventional recommendation engines infer user interest based on indirect information sources such as short-term session history, long-term user behavioral data, ontology the site uses to organize inventory, and the state of active inventory.

BRIEF DESCRIPTION OF THE DRAWINGS

Various ones of the appended drawings merely illustrate example embodiments of the present disclosure and cannot be considered as limiting its scope.

DETAILED DESCRIPTION

Reference will now be made in detail to specific example embodiments for carrying out the inventive subject matter. Embodiments may be practiced without some or all of these details. It will be understood that the forgoing disclosure is not intended to limit the scope of the claims to the described embodiments. On the contrary, it is intended to cover alternatives, modifications, and equivalents as may be included within the scope of the disclosure as defined by the appended claims. In addition, well known features may not have been described in detail to avoid unnecessarily obscuring the subject matter.

Example embodiments involve a system and methods for recommending alternatives to a given item in an e-commerce setting (referred to herein as "alternative item recommendations") based on near user queries (NUQ). In this way, the system and methods provide an improvement over an earlier system, which simply recommends items that are similar to a seed item (e.g., items that share common attributes with the seed item). The system and methods described herein improve the earlier system by analyzing terms used in recent queries to personalize recommendations. The system and methods use query terms to determine important item dimensions and a level of abstraction in item similarity, and to adjust the item similarity to user intentions. In this way, user engagement may increase because recommendations contain more query terms, and the current system increases query coverage without sacrificing input item similarity and item quality.

Example embodiments involve provisioning alternative item recommendations to a user, who has engaged with a seed item, to suggest other items to the user that he or she may consider as alternatives to the original item. As an example, a user shopping at an e-commerce website may be viewing an item details page before initiating the purchase process. At this point, a recommendation engine recommends alternatives to the current item to provide a user with new options. Traditionally employed methods for providing recommendations such as Similar Item Recommendations (SIR) aim to provide the user with items that are similar to the seed item while providing a customizable parameter to increase quality and diversity of recommended items by allowing reduction of similarity. However, these traditional methods do not account for actions of the user prior to visiting the item page, and will return the same recommendation regardless of the query that leads the user to the item detail page. In contrast, example embodiments of the present disclosure use the query leading the user to the item details page to provide personalized and similar alternative item recommendations.

Alternative item recommendations may further be distinguished from similar-taste recommendations (e.g. people who like "tents" also like "bicycles"), and complementary item recommendations (people who bought "iPhone" may also buy an "iPhone case"), which are typically tackled with methods like collaborative filtering, in that these methods recommend items that do not necessarily serve as a replacement for the original item. Alternative item recommendations include items that are similar to the original item (referred to herein as the "seed item") at some level of abstraction.

Alternative item recommendations negotiate a trade-off between seed-item-similarity, diversity, and quality. In order for the recommended items to act as a suitable alternative, the items included in the recommendations bear some similarity to the seed item, while differing in some other dimensions (e.g., different price, color, capacity) to provide the user with new options. Furthermore, in some instances, the recommended items may be better than the seed item in some aspects (e.g., better price, better seller quality, better condition) so as to provide the user with a reason to prefer them over the seed item.

The level of similarity of the alternative items depends on the intention of the user. For example, if a user is shopping for an electronics gift item, a smart phone device can be a viable alternative to a tablet device. On the other hand, if the user intention is to buy an ultra-light laptop of a particular brand, the alternatives should have a closer similarity to the seed item. To this end, example embodiments involve capturing information about user intentions in order to improve alternative recommendations.

Example embodiments involve a system architecture that personalizes alternatives recommendations using short-term in-session data. In particular, the system may determine the scope of items a user may be interested in, and the system may consider only recommendation candidates (e.g., items) that are within that scope. The system may further detect item attributes in recent user queries that may be desired by the user, and provide greater weight to items that contain the desired attributes when selecting the top few recommendations from a pool of candidates. The desire of the user with regard to certain item attributes is inferred based on the inclusion of keywords associated with the item attributes being included in the search query.

Figure 1:
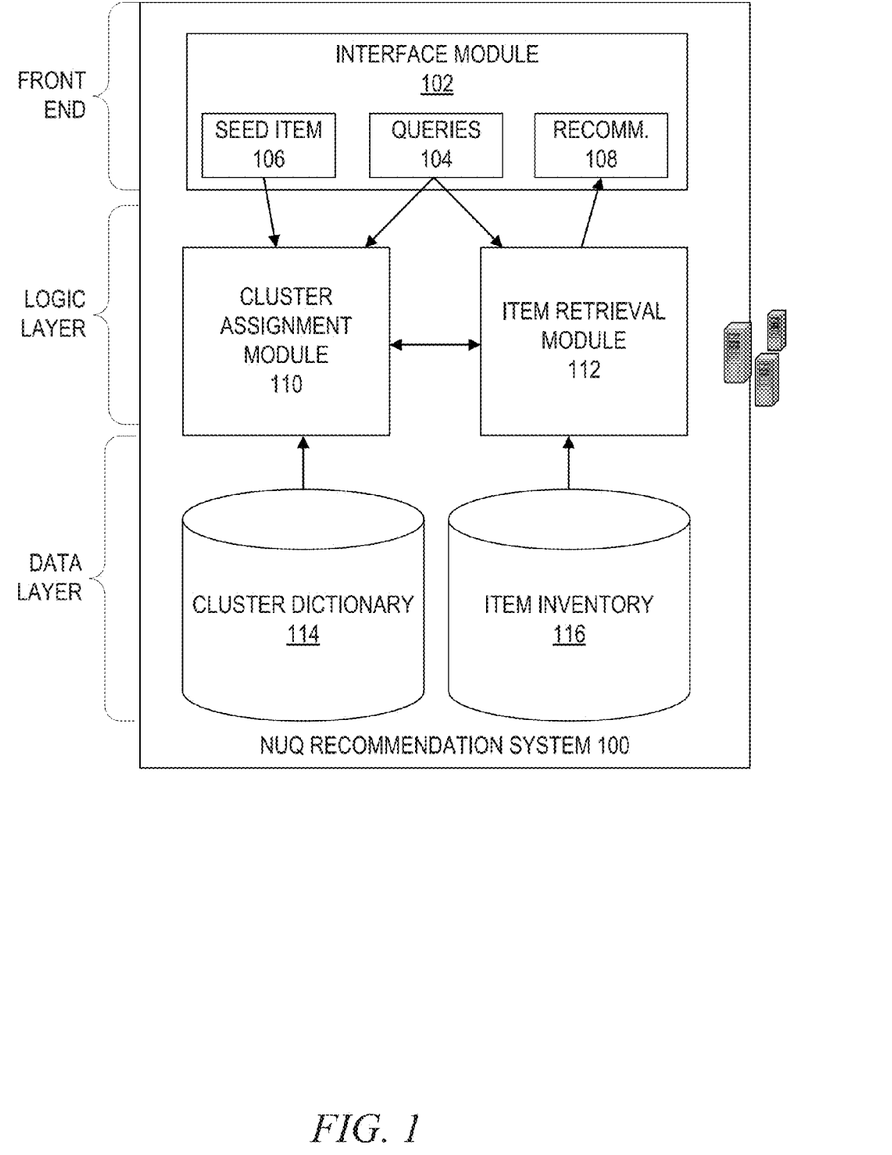
FIG. 1 is a block diagram illustrating a high-level architecture of a near user query (NUQ) recommendation system, according to an example embodiment.

FIG. 1 is a block diagram illustrating a high-level architecture of a near user query (NUQ) recommendation system 100, according to an example embodiment. As shown in FIG. 1, NUQ recommendation system 100 is generally based on a three-tiered architecture, comprising a front-end layer, an application logic layer, and a data layer. As is understood by skilled artisans in the relevant computer and Internet-related arts, each functional component (e.g., module) shown in FIG. 1 represents a set of executable software instructions and the corresponding hardware (e.g., memory and processor) for executing the instructions.

As shown in FIG. 1, the front end comprises a user interface module 102 (e.g., a web server), which receives requests from various client-computing devices and communicates appropriate responses to the requesting client devices. The user interface module 102 may receive requests from client devices in the form of Hypertext Transport Protocol (HTTP) requests or other web-based, application programming interface (API) requests.

For example, the user interface module 102 may receive a search query 104 (e.g., a keyword search) from a client device of a user and, in response to the received search query 104, provide the client device with a list or set of search results that satisfies the search query 104. The set of results includes one or more content items. As used herein, the terms "content" or "content item" refer to electronic data that is consumed by viewers (e.g., users) on displays, client devices or page/display-based media (e.g., World-Wide Web (WWW) media embodied in browsers and accessible over the internet). As such, the terms "content" and "content item" may refer to data associated with readable text, data associated with images, data associated with graphics or video, programmatic content, scripts, or data corresponding to various combinations of these (e.g., web pages). In some embodiments, the content items retrieved in response to the search query 104 correspond to a product details page or product listing page of an item. As another example, the user interface module 102 may receive a request from a user to view a particular content item (e.g., a web page provided as part of the list of search results), which is referred to as a seed item 106, and in response, the user interface module 102 provides the client device with computer-readable instructions to present the web page along with one or more alternative item recommendations 108.

As shown in FIG. 1, the data layer of the NUQ recommendation system 100 includes multiple databases including a cluster dictionary 114 and an item inventory 116. The cluster dictionary 114 stores definitions of item clusters (referred to as "cluster expression") that group a set of items. The cluster expressions include a collection of phrases, categories an item belongs to, and a set of attribute value pairs that describe items. The cluster expression may be learned from a mixture of information sources including user queries, items in the item inventory 116, and search filters. The clusters may be created to group items that users view together in search queries 104, and therefore, act as high-level features (e.g., item attributes) that represent subjective similarity. In particular, the clusters may correspond to specializations of frequent user queries. Moreover, the clusters may be constructed using data about search filters (e.g., color=red) people interact with in the search UI after entering a search query 104. Table 1, presented below, shows example clusters, where each cluster is linked to a collection of attributes, and Table 2, also presented below, shows the items that correspond to these clusters, according to an example.

TABLE 1

| Clusters |
|---|
| $c_1$: {baby, piano} |
| $c_2$: {musical, animal, farm, toy} |

TABLE 2

| Item | Title | Cluster(s) |
|---|---|---|
| $i_1$ | Childs Grand Baby Piano with Kids Bench of Solid Wood Construction | $c_1$ |
| $i_2$ | 22 Lot Tiny People Musical Sound Farm Barn Animals Tractor CLEAN | $c_2$ |
| $i_3$ | RED Baby Kids Toddler Musical Educational Animal Farm Piano Developmental Toy | $c_1$, $c_2$ |

The item inventory 116 stores inventory data for available items. In some embodiments, the item inventory databased 116 includes inventory data for a collection of products available for sale on a network-based marketplace. In these embodiments, the inventory data may include product information. Such product information describe item attributes such as a product identifier (e.g., a title or a model number), a category, a price, a make, a manufacturer, a model, a brand name, a textual description, a size, a style, product dimensions, compatibility information, or any other information that may be used to describe a product.

As shown, the application logic layer of the NUQ recommendation system 100 includes run-time logic that takes the seed item 106 and the search query 104 as input and returns the one or more alternative item recommendations 108, which are similar to the seed item 106 and are consistent with the search query 104. At a high-level, the NUQ recommendation system 100 operates in two main phases. In the first phase, a cluster assignment module 110 assigns the seed item 106 to clusters, and creates recall expressions using those clusters. In the second phase, an item retrieval module 112 identifies and retrieves items from the data layer that satisfy the created recall expressions. Both the cluster assignment module 110 and the item retrieval module 112 accept the search query 104 as an input, and use the search query 104 to skew the resulting alternative item recommendations 108 to maintain consistency with the search query 104. In this manner, the NUQ recommendation system 100 customizes recommendations to short-term user intentions by preferring items that are consistent with recent queries.

The cluster assignment module 110 begins the cluster assignment phase by retrieving raw item attributes of the seed item 106. For example, the cluster assignment module 110 may use an item title and a category identifier as raw data in the cluster assignment. It shall be appreciated that category is merely an example ontology used to organize the items in the item inventory 116 into a hierarchy and, in other embodiments, other ontologies may be employed. The cluster assignment module 110 runs the item title through a number of normalization steps including, for example, spell correction, normalization, and attribute extraction, which results in an item feature vector comprising a set of normalized phrases and feature value pairs.

During the cluster assignment phase, the cluster assignment module 110 also accesses at least one of the search queries and runs it through the same normalization process to create a query feature vector. As with the item feature vector, the query feature vector includes a set of normalized pairs and attribute value pairs (e.g., corresponding to desired attributes). Next, the cluster assignment module 110 selects a set of attributes in the query feature vector that are consistent with the item vector (e.g., a set of attributes that is common to both the query feature vector and the item feature vector) and marks them as context boosting factors (CBF). In this way, the NUQ recommendation system 100 may prioritize recommendations that are consistent with the CBF. In some embodiments, the cluster assignment module 110 creates CBF using the last received query. In other embodiments, the cluster assignment module 110 may use queries in the recent history and weight the effect of factors by recency.

In assigning the seed item 106 to a cluster, the cluster assignment module 110 returns cluster expressions similar to the item vectors utilizing a term frequency-inverse document frequency (TF-IDF) measure, which prioritizes rare attributes over more frequent ones. The cluster assignment module 110 further boosts item attributes that are consistent with the query vector such that for given a pair of clusters C1 and C2, C1 is guaranteed to rank lower than C2, if C1∩CBF is a subset of C2∩CBF.

For example, if the last user query is "baby piano," the NUQ recommendation system 100 is guaranteed to prioritize clusters that contain both of the terms "baby" and "piano," if any such cluster exists. Moreover, any cluster that contains "baby" or "piano," is also guaranteed to be prioritized over clusters that do not have any of those terms. Finally, the relative importance of a cluster that contains "baby" (but not "piano"), over another cluster that contains "piano" (but not "baby"), is determined by the rareness of those terms in the cluster dictionary 114.

In this manner, the cluster assignment module 110 allows diversity in a set of recommended items by retrieving n clusters in order, C1, C2, . . . , Cn, such that each new cluster Cj is negatively boosted by the cluster Ci when i<j. If the cluster assignment module 110 selects one item for each cluster, it can display a set of diverse items which are similar to the seed item 106 in different dimensions while satisfying context boosting factors.

Figure 2:
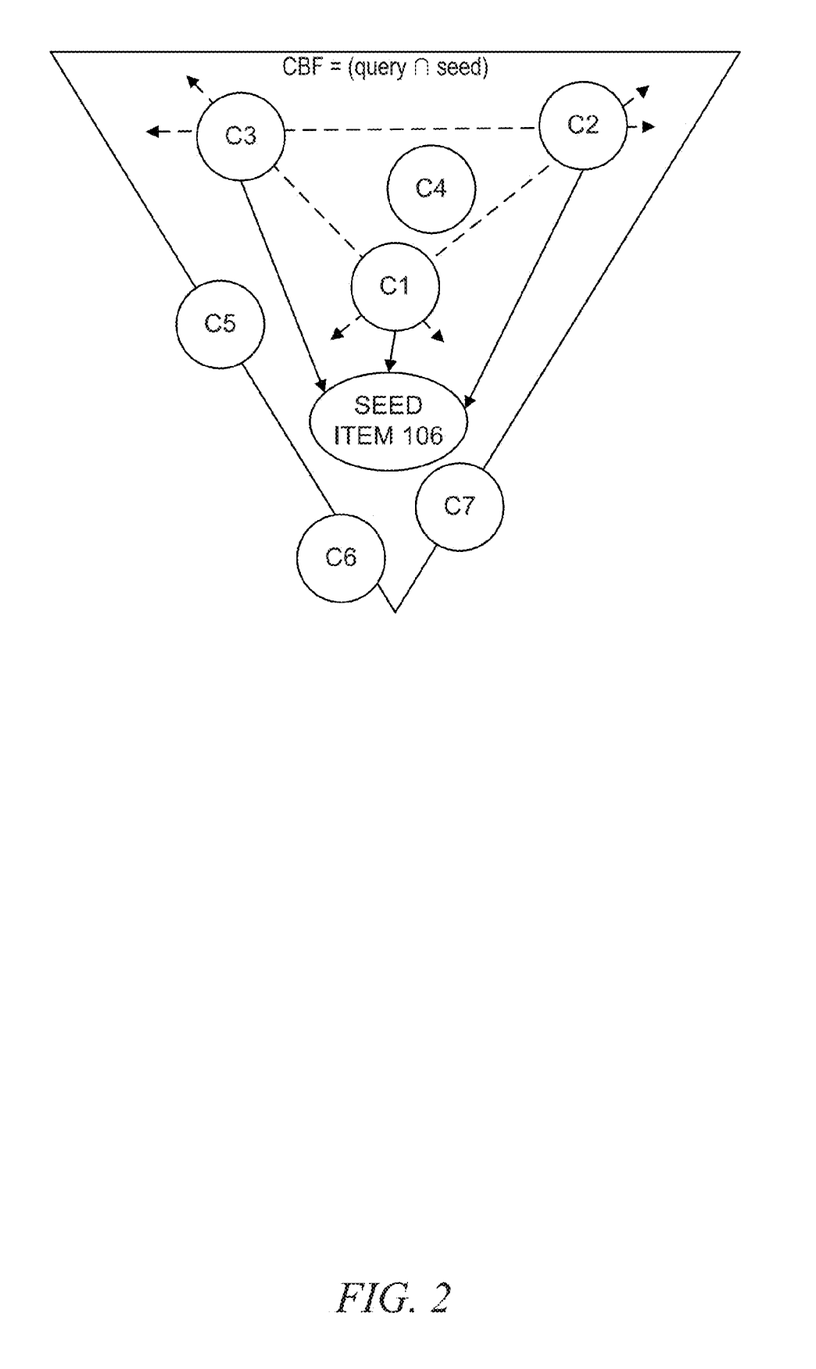
FIG. 2 is a diagram illustrating a cluster assignment operation of the NUQ system, according to an example embodiment.

As an example of the foregoing operations, FIG. 2 is an abstract diagram depicting the cluster assignment phase of operation of the NUQ recommendation system 100, according to an example embodiment. FIG. 2 includes the seed item 106, and clusters C1-C7. As shown in FIG. 2, clusters close to the seed item 106 are given priority (solid arrow). Moreover, clusters that contain all CBF terms (e.g., C1, C2, C3, and C4) are given priority over clusters containing some of the CBF terms (e.g., C5, C6, and C7), even though a portion of those clusters (e.g., C6, and C7) may be closer to the seed item 106. Moreover, when diversity constraints are applied. NUQ recommendation system 100 gives priority to clusters that are dissimilar from each other. For example if C1 is selected, the next selected cluster would be C3 or C2 rather than C4.

Referring back to FIG. 1, once the applicable cluster expressions are retrieved from the cluster dictionary 114, the cluster assignment module 110 generates a recall expression using the retrieved cluster expression and the search query 104. The recall expression is then provided to the item retrieval module 112. The item retrieval module 112 uses the recall expression to retrieve a set of candidate recommendation items from item inventory 116. In this way, the cluster expressions look like search queries 104, grouping items that are similar in some aspects together.

The item retrieval module 112 then ranks the retrieved set of candidate recommendation items. In ranking the retrieved set of candidate recommendation items, the item retrieval module 112 utilizes an ordering function that negotiates a trade-off between item similarity and quality while giving preference to items that have terms consistent with CBFs obtained from search queries 104. For example, the item retrieval module 112 may utilize the following function:

$$\text{Score}(\text{seed},\text{reco})=w_1 \cdot \text{Sim}(\text{seed},\text{reco})+w_2 \cdot \text{Quality}(\text{reco})$$

In the above function, seed is the seed item 104 and reco is the candidate item for recommendation. The item retrieval module 112 determines item ranking by using a weighted average between a similarity function Sim and quality of the recommended item as measured by a Quality function. The item retrieval module 112 uses the similarity function Sim that compares the shared and not shared tokens between seed and reco, but weights the terms with domain specific importance. The item retrieval module 112 further boosts these weights if the terms belong to the search query 104.

In instances in which the clusters contain all context boosting factors, ranking time boosting may not be employed since all candidate items generated from these clusters would satisfy these factors already. However, in other instances, the NUQ recommendation system 100 retrieves clusters missing context boosting factors. This typically happens when the query terms (or a particular combination of query terms) are not frequent enough in past inventory to warrant construction of clusters that contain all of them. In that case, the NUQ recommendation system 100 employs an algorithm that measures seed item similarity using weighted terms, and further boosts the weight of terms that are in the set of context boosting factors.

To avoid obscuring the inventive subject matter with unnecessary detail, various functional components that are not germane to conveying an understanding of the inventive subject matter have been omitted from FIG. 1. However, a skilled artisan will readily recognize that various additional functional components may be supported by the NUQ recommendation system 100 to facilitate additional functionality that is not specifically described herein. Furthermore, although depicted in FIG. 1 as a three-tiered architecture, the inventive subject matter is by no means limited to such architecture. Moreover, the various functional components depicted in FIG. 1 may reside on a single server computer, or may be distributed across several server computers in various arrangements. Additionally, although the NUQ recommendation system 100 is illustrated as being an independent system, in some embodiments, the NUQ recommendation system 100 may be incorporated as part of a larger system.

Figure 3:
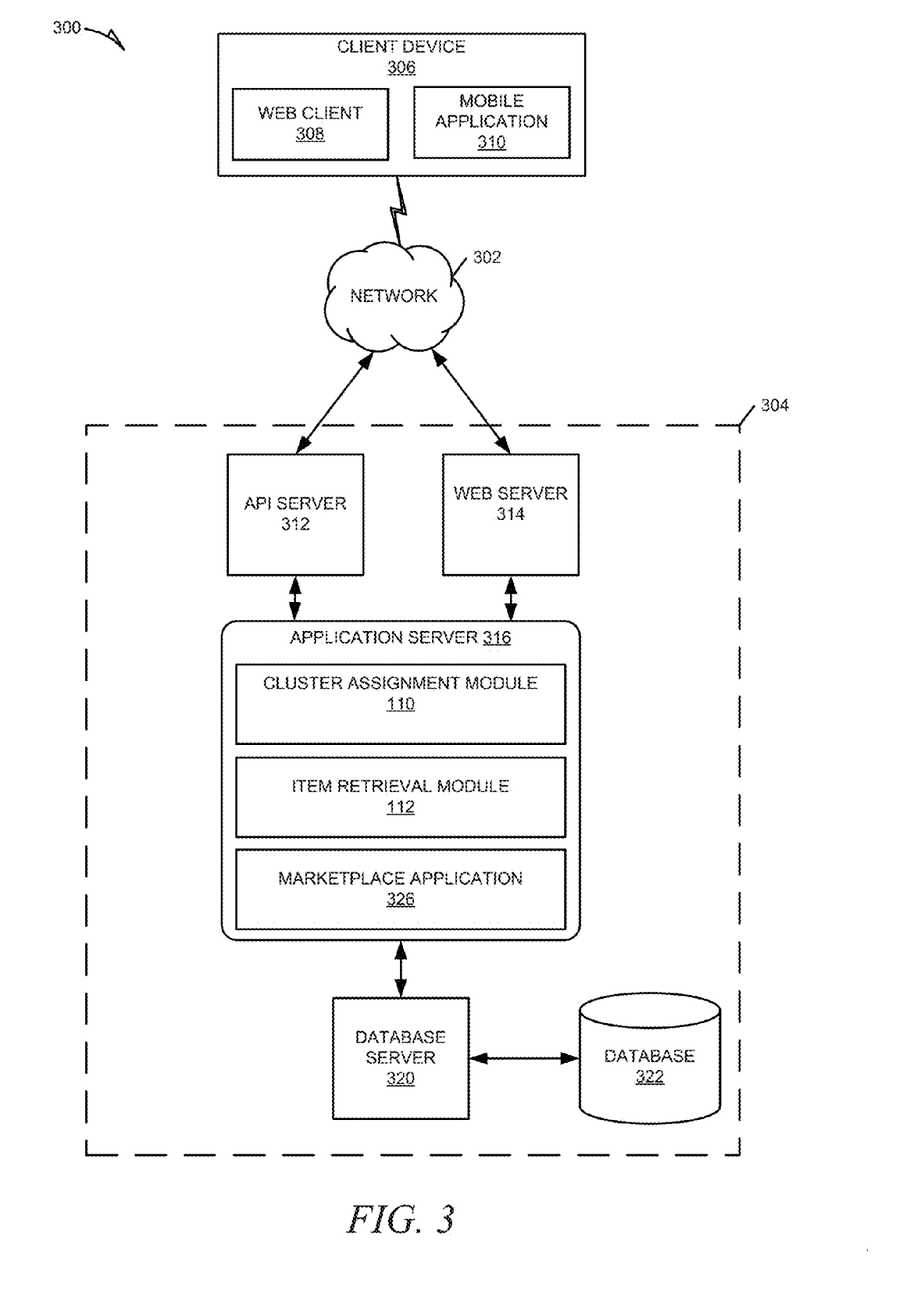
FIG. 3 is a network diagram depicting a network system having a client-server architecture configured for exchanging data over a network, according to an example embodiment.

As an example, FIG. 3 is a network diagram depicting a network system 300 having a client-server architecture configured for exchanging data over a network 302. The network system 300 includes a network-based content publisher 304 in communication with a client device 306. The network-based content publisher 304 may, for example, be a network-based marketplace.

The network-based content publisher 304 communicates and exchanges data within the network system 300 that pertain to various functions and aspects associated with the network system 300 and its users. The network-based content publisher 304 provides server-side functionality, via the network 302 (e.g., the Internet), to the client device 306 that allows the client device 306 to exchange data with the network-based content publisher 304. These data exchanges include transmitting, receiving, and processing data to, from, and regarding content and users of the network system 300. The data include, but are not limited to: images; video or audio content; user preferences; product and service feedback, advice, and reviews; product, service, manufacturer, and vendor recommendations and identifiers; product and service listings associated with buyers and sellers; product and service advertisements; auction bids; transaction data; and social data, among other things.

In various embodiments, the data exchanged within the network system 300 may be dependent upon user-selected functions available through one or more client or user interfaces (UIs). The UIs may, for example, be specifically associated with a web client 308 (e.g., a browser) executing on the client device 306, and in communication with the network-based content publisher 304. The UIs may also be associated with a mobile application 310 executing on the client device 306, such as a client application specifically designed for interacting with the network-based content publisher 304.

Turning specifically to the network-based content publisher 304, an API server 312 and a web server 314 are coupled to (e.g., via wired or wireless interfaces), and provide programmatic and web interfaces, respectively, to an application server 316. The API server 312 and the web server 314 may collectively provide the functionality of the front end of the NUQ recommendation system 100, consistent with some embodiments. The application server 316 may, for example, host the cluster assignment module 110 and the item retrieval module 112 that form the application layer of the NUQ recommendation system 100.

The application server 316 may also host a marketplace application 326. The marketplace application 326 provides a number of marketplace functions and services to users that access the network-based content publisher 304. For example, the marketplace application 326 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services.

As illustrated in FIG. 3, the application server 316 is coupled to a database server 320 that facilitates access to a database 322. The database 322 may stores data pertaining to various functions and aspects associated with the network system 300 and its users. The database 322 may include multiple databases that may be internal or external to the network-based content publisher 304. For example, the database 322 may include the cluster dictionary 114 and the item inventory 116.

Additionally, user profiles of users of the network-based content publisher 304 may be stored and maintained as part of the database 322. Each user profile comprises user profile data that describes aspects of a particular user. The user profile data may, for example, include demographic data (e.g., gender, age, location information, employment history, education history, contact information, familial relations, or user interests), user preferences, social data, and financial information (e.g., an account number, credential, password, device identifier, user name, phone number, credit card information, bank information, transaction history, or other financial information which may be used to facilitate online transactions by the user).

The user profile data may also include a record of user activity, consistent with some embodiments. Accordingly, the network-based content publisher 304 may monitor, track, and record the activities and interactions of a user, using one or more devices, with the various modules of the network system 300. Each user session may be stored in the database 322 and maintained as part of the user profile data. Accordingly, the user profile data may include past keyword searches that users have performed, web pages viewed by each user, products added to a user wish list or watch list, products added to an electronic shopping cart, and products that the users own.

While the cluster assignment module 110 and item retrieval module 112 are shown in FIG. 3 to form part of the network-based content publisher 304, it will be appreciated that, in alternative embodiments, the cluster assignment module 110 and item retrieval module 112 may form part of a service that is separate and distinct from the network-based content publisher 304 (e.g., the NUQ recommendation system 100 illustrated in FIG. 1). Further, while the system 300 shown in FIG. 3 employs a client-server architecture, the present inventive subject matter is, of course, not limited to such an architecture, and could equally well find application in an event-driven, distributed, or peer-to-peer architecture system, for example.

Figure 4:
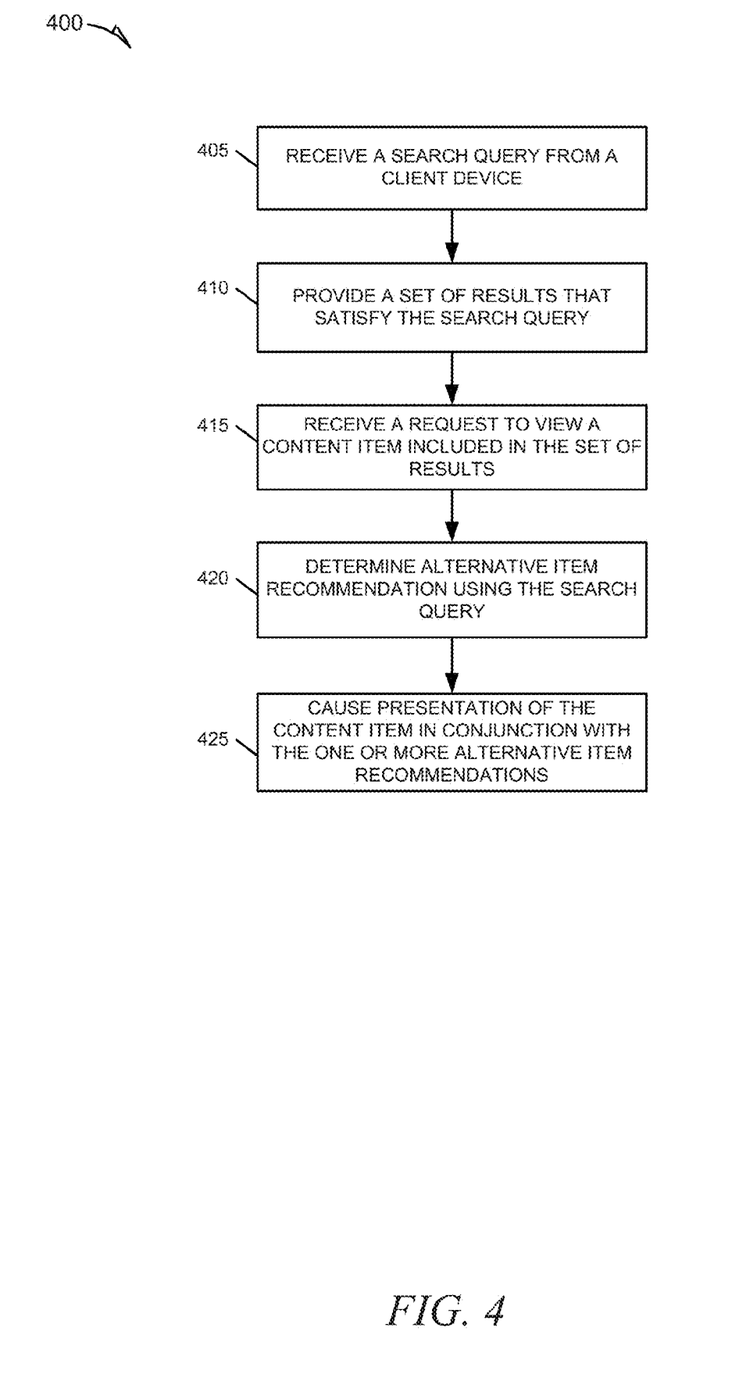
FIG. 4 is a flowchart illustrating a method for providing an alternative item recommendation, according to an example embodiment.

FIG. 4 is a flowchart illustrating a method 400 for providing alternative item recommendations 108, according to an example embodiment. The method 400 may be embodied in computer-readable instructions for execution by one or more processors such that the steps of the method 400 may be performed in part or in whole by the functional components of the NUQ recommendation system 101; accordingly, the method 400 is described below by way of example with reference thereto. However, it shall be appreciated that the method 400 may be deployed on various other hardware configurations and is not intended to be limited to the functional components of the NUQ recommendation system 100.

At operation 405, the interface module 102 receives a search query 104 from a client device (e.g., client device 306) of a user. The query 104 includes one or more keywords. In some embodiments, the interface module 102 may store the search query 104 in the database 322 as part of a user profile of the user. At operation 410, the interface module 102 provides a set of search results (e.g., a list of content items) to the client device 306 that satisfy the search query 104 (e.g., the interface module 102 provides a set of instructions to the client device 306 that causes the client device 306 to display the set of search results). At operation 415, the interface module 102 receives, from the client device 306 of the user, a request to view an item (e.g., a web page with product details) included in the set of results. The item for which the request pertains is used as the seed item 106 for later analysis by the NUQ recommendation system 100.

At operation 420, the NUQ recommendation system 100 determines alternative item recommendations using at least the search query received at operation 405 by the interface module 102. In some instances, the NUQ recommendation system 100 may access the previously stored search query as part of determining the one or more alternative item recommendations. Consistent with some embodiments, the determining of the one or more alternative item recommendations may include identifying one or more desired item attributes (e.g., characteristics of an item) based on the search query (e.g., item attributes included as or inferred from one or more keywords included in the search query), identifying a set of candidate items having the one or more desired item attributes, and generating the alternative item recommendations using the set of candidate items. In some embodiments, determining the alternative item recommendation may further include ranking the set of candidate items according one or more context boosting factors determined based on the search query, and selection of a portion of the candidate items based on rank. Further details of the operation 420, consistent with some embodiments, are discussed below in reference to FIG. 5.

At operation 425, the interface module 102 causes presentation of the requested item along with the one or more alternative item recommendations. For example, the interface module 102 provides instructions to the client device 306 that causes the client device 306 to present a product details page for a product listed for sale. The product details page includes the one or more alternative item recommendations, which, in this example, are other products listed for sale.

Figure 5:
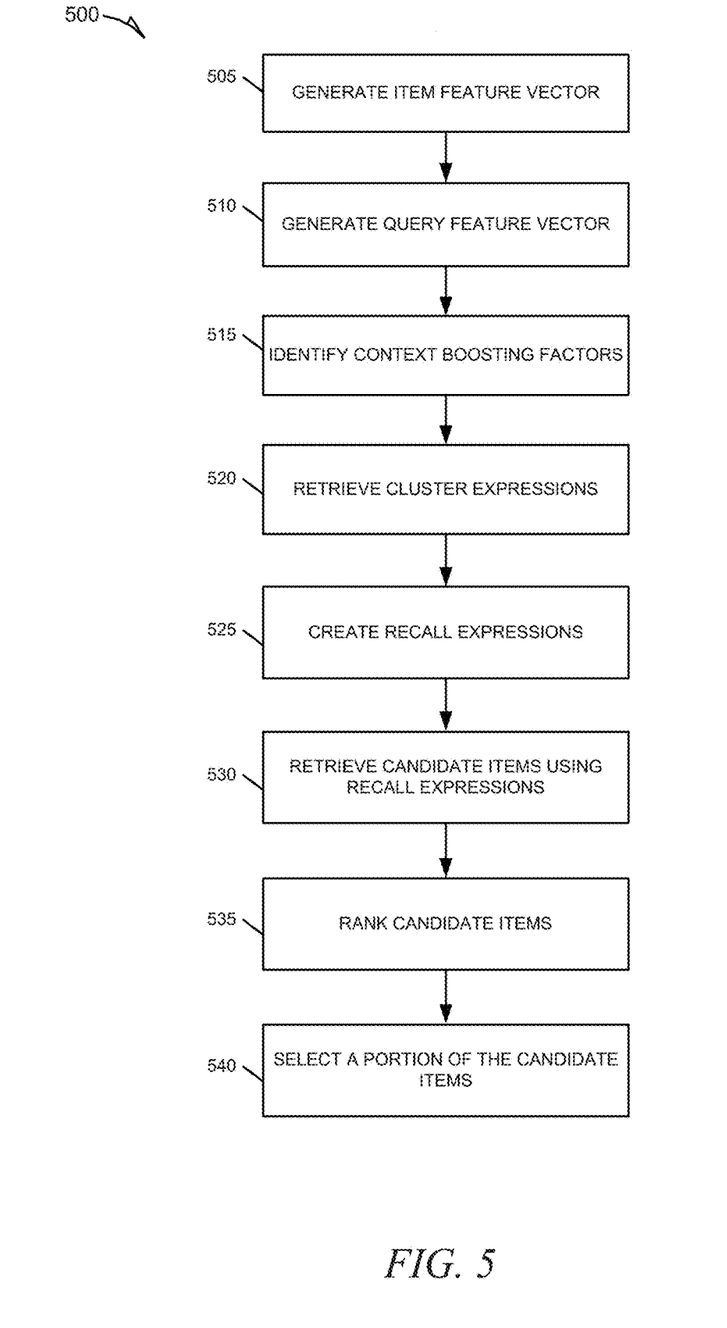
FIG. 5 is a flowchart illustrating a method for determining an alternative item recommendation, according to an example embodiment.

FIG. 5 is a flowchart illustrating a method 500 for determining an alternative item recommendation, according to an example embodiment. The method 500 may, in some embodiments, correspond to the operation 420 of method 400. The method 500 may be embodied in computer-readable instructions for execution by one or more processors such that the steps of the method 500 may be performed in part or in whole by the functional components of the NUQ recommendation system 100; accordingly, the method 500 is described below by way of example with reference thereto. However, it shall be appreciated that the method 500 may be deployed on various other hardware configurations and is not intended to be limited to the functional components of the NUQ recommendation system 100.

At operation 505, the cluster assignment module 110 uses raw item attributes (e.g., item title and category identifier) obtained from inventory data about the seed item to generate an item feature vector. The item feature vector includes a set of normalized phrases and attribute value pairs. At operation 510, the cluster assignment module 110 generates a query feature vector from a received user query. As with the item feature vector, the query feature vector includes a set of normalized phrases and attribute value pairs (e.g., corresponding to the desired item attributes).

At operation 515, the cluster assignment module 110 selects a set of attributes that are common to both the query vector and the item feature vector, and identifies the set of attributes as context boosting factors. At operation 520, the cluster assignment module 110 retrieves cluster expressions that are similar to the item vectors. In retrieving cluster expressions, the cluster assignment module 110 gives preference to cluster expressions having item attributes that are consistent with the query vector. In some embodiments, the cluster assignment module 110 may utilize a TF-IDF measure that prioritize rare attributes over more frequent ones. At operation 525, the cluster assignment module 110 creates recall expressions using the retrieved item clusters.

At operation 530, the item retrieval module 112 retrieves a set of candidate recommendation items using the created recall expressions. At operation 535, the item retrieval module 112 ranks each candidate item in the set of candidate items in accordance with the identified context boosting factors. In some embodiments, the item retrieval module 112 determines item ranking by using a weighted average between similarity and quality of the recommended item. At operation 540, the item retrieval module 112 selects a portion of the candidate items from the set of candidate items based on the ranking. For example, the item retrieval module 112 may select the top three ranked items. The items selected by the item retrieval module 112 correspond to the alternative item recommendations that are provided by the NUQ recommendation system 100.

Figure 6:
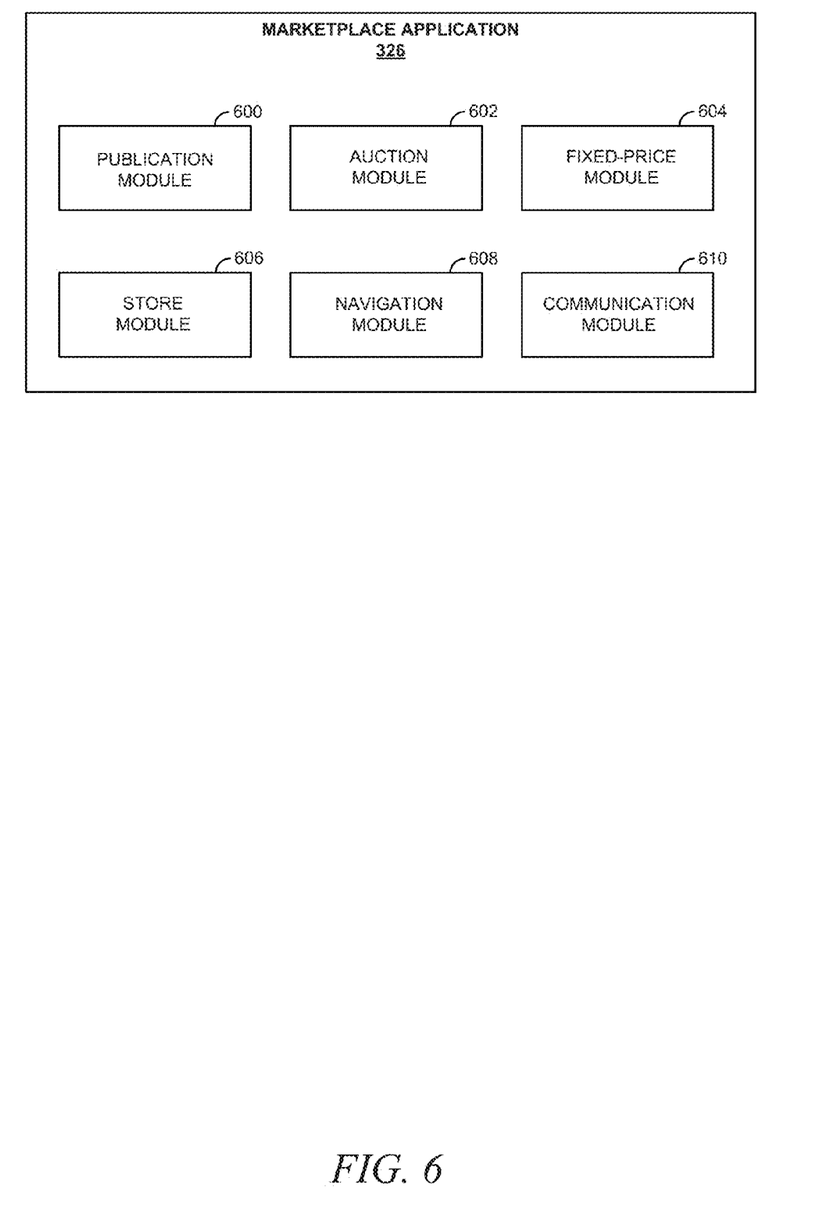
FIG. 6 is a block diagram illustrating an example embodiment of multiple marketplace applications, which are provided as part of the network based marketplace.

FIG. 6 is a block diagram illustrating an example embodiment of multiple modules forming the marketplace application 326, which is provided as part of the network system 300 of FIG. 3. The modules of the marketplace application 326 may be hosted on dedicated or shared server machines that are communicatively coupled to enable communications between server machines. Each of the modules of the marketplace application 326 are communicatively coupled (e.g., via appropriate interfaces) to each other and to various data sources, so as to allow information to be passed between the modules or so as to allow the modules to share and access common data. The various modules of the marketplace application 326 may further access the databases 322 via the database servers 320. Further, while the modules of the marketplace application 326 are discussed in the singular sense, it will be appreciated that, in other embodiments, multiple instances of any one of the modules may be employed. Moreover, while the modules of FIG. 6 are shown to all form part of the marketplace application 326, it will be appreciated that, in alternative embodiments, any one of the modules may form part of a service that is separate and distinct from the network-based content publisher 304.

The marketplace application 326 provides a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace application 326 is shown to include a publication module 600 and an auction module 602 which support auction-format listing and price setting mechanisms (e.g., English, Dutch, Vickrey, Chinese, Double, Reverse auctions). The auction module 602 may also provide a number of features in support of such auction-format listings, such as a reserve price feature whereby a seller may specify a reserve price in connection with a listing and a proxy-bidding feature whereby a bidder may invoke automated proxy bidding.

A fixed-price module 604 supports fixed-price listing formats (e.g., the traditional classified advertisement-type listing or a catalogue listing) and buyout-type listings. Specifically, buyout-type listings may be offered in conjunction with auction-format listings, and allow a buyer to purchase goods or services, which are also being offered for sale via an auction, for a fixed-price that is typically higher than the starting price of the auction.

A store module 606 allows sellers to group their item listings (e.g., goods and/or services) within a "virtual" store, which may be branded and otherwise personalized by and for the sellers. Such a virtual store may also offer promotions, incentives, and features that are specific and personalized to a relevant seller. In one embodiment, the listings or transactions associated with the virtual store and its features may be provided to one or more users.

Navigation of the network-based content publisher 304 may be facilitated by a navigation module 608. For example, the navigation module 608 may, inter alia, enable key word searches of listings published via the network-based content publisher 304. The navigation module 608 may allow users, via an associated user interface, to browse various category, catalogue, inventory, social network, and review data structures within the network-based content publisher 304. Various other navigation applications (e.g., an external search engine) may be provided to supplement the search and browsing applications.

A communication module 610 is used for generation and delivery of messages including the recommendation to users of the auction module 602. The communication module 610 may utilize any one of a number of message delivery networks and platforms to deliver messages to users. For example, the communication module 610 may deliver electronic mail (e-mail), instant message (IM), Short Message Service (SMS), text, facsimile, or voice (e.g., Voice over IP (VoIP)) messages via the wired (e.g., the Internet), plain old telephone service (POTS), or wireless (e.g., mobile, cellular, WiFi, WiMAX) networks.

It will be appreciated that one or more of the various modules forming the marketplace application 326 may be combined into a single module. Further, in some embodiments, one or more modules may be omitted and additional applications may also be included.

Machine Architecture

Figure 7:
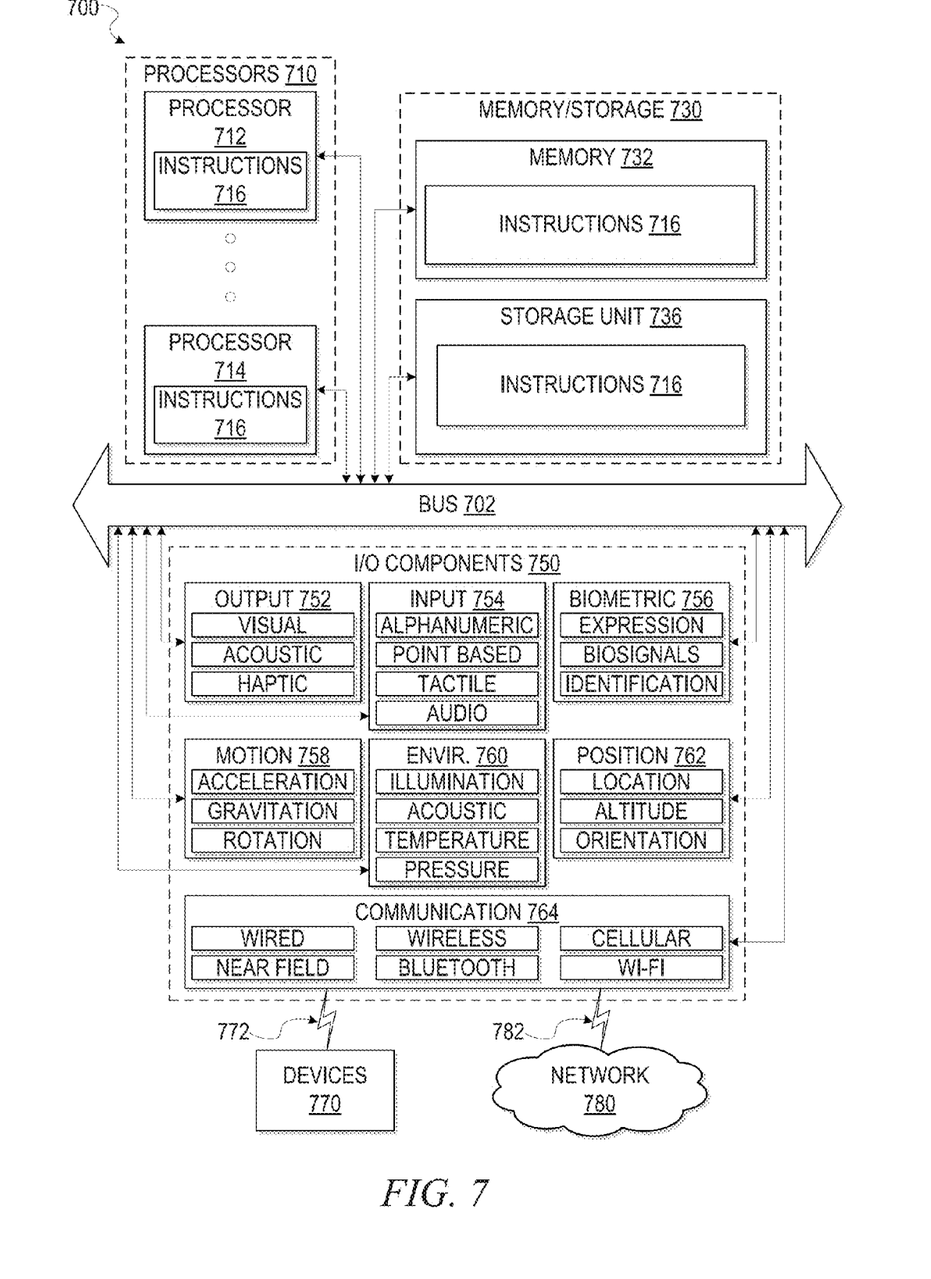
FIG. 7 is a diagrammatic representation of a machine in the example form of a computer system within which a set of instructions for causing the machine to perform any one or more of the methodologies discussed herein may be executed.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 include executable code that causes the machine 700 to execute the functionality of the NUQ recommendation system 100 and the associated functionalities described herein. These instructions 716 transform the general, non-programmed machine 700 into a specially configured machine 700 programmed to carry out the described and illustrated functions of the NUQ recommendation system 100 in the manner described herein. The machine 700 may operate as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. By way of non-limiting example, the machine 700 may comprise or correspond to a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory/storage 730, and I/O components 750, which may be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 712 and processor 714 that execute instructions 716. The term "processor" is intended to include multi-core processor that may comprise two or more independent processors (sometimes referred to as "cores") that execute instructions contemporaneously. Although FIG. 7 shows multiple processors, the machine 700 may include a single processor with a single core, a single processor with multiple cores (e.g., a multi-core processor), multiple processors with a single core, multiple processors with multiples cores, or any combination thereof.

The memory/storage 730 may include a memory 732, such as a main memory, or other memory storage, and a storage unit 736, both accessible to the processors 730 such as via the bus 702. The storage unit 736 and memory 732 store the instructions 716, embodying any one or more of the methodologies or functions described herein. The instructions 716 may also reside, completely or partially, within the memory 732, within the storage unit 736, within at least one of the processors 712 (e.g., within the processor's cache memory), or any suitable combination thereof, during execution thereof by the machine 700. Accordingly, the memory 732, the storage unit 736, and the memory of processors 710 are examples of machine-readable media.

As used herein, "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 730), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

Furthermore, the machine-readable medium is non-transitory in that it does not embody a propagating signal. However, labeling the tangible machine-readable medium "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 750 may include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762 among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via coupling 782 and coupling 772 respectively. For example, the communication components 764 may include a network interface component or other suitable device to interface with the network 780. In further examples, communication components 764 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a Universal Serial Bus (USB)).

Moreover, the communication components 764 may detect identifiers or include components operable to detect identifiers. For example, the communication components 764 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 780 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 780 or a portion of the network 780 may include a wireless or cellular network and the coupling 782 may be a Code Division Multiple Access (CDMA) connection, a Global System for Mobile communications (GSM) connection, or other type of cellular or wireless coupling. In this example, the coupling 782 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 may be transmitted or received over the network 780 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 772 (e.g., a peer-to-peer coupling) to devices 770. The term "transmission medium" shall be taken to include any intangible medium that is capable of storing, encoding, or carrying instructions 716 for execution by the machine 700, and includes digital or analog communications signals or other intangible medium to facilitate communication of such software.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

Electronic Apparatus and System

Example embodiments may be implemented in digital electronic circuitry, or in computer hardware, firmware, or software, or in combinations of them. Example embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network 780.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice. Below are set out hardware (e.g., machine) and software architectures that may be deployed, in various example embodiments.

Language

Although the embodiments of the present invention have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

All publications, patents, and patent documents referred to in this document are incorporated by reference herein in their entirety, as though individually incorporated by reference. In the event of inconsistent usages between this document and those documents so incorporated by reference, the usage in the incorporated references should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim.

What is claimed:

1. A method for providing an improved recommendation system, the method comprising:

receiving a search query from a client device, the search query including one or more keywords;

providing a set of search results to the client device;

receiving, from the client device, a request to view an item included in the set of search results retrieved in response to the search query;

in response to receiving the request to view the item, determining, using a computing device of the improved recommendation system, an alternative item recommendation using the one or more keywords of the search query and one or more attributes of the item, the alternative item recommendation including at least one further item that is similar to the item, wherein determining the alternative item recommendation comprises:

generating an item feature vector corresponding to the item, the item feature vector including a first plurality of attribute value pairs;

generating a query feature vector corresponding to the search query, the query feature vector including a second plurality of attribute value pairs;

identifying, from a plurality of item clusters, one or more item clusters based on the item feature vector, each of the plurality of item clusters having at least one corresponding cluster expression;

selecting one or more cluster expressions from the one or more item clusters based on the item feature vector and the query feature vector, each of the one or more cluster expressions including a set of attribute value pairs that describe items in a corresponding cluster; and retrieving a set of candidate items based on the one or more cluster expressions, wherein the alternative item recommendation includes at least one item from the set of candidate items; and causing presentation, on the client device, of a user interface displaying the item and the alternative item recommendation.

2. The method of claim 1, further comprising:

identifying one or more desired item attributes based on the search query; and identifying a set of candidate items having the one or more desired item attributes;

wherein the alternative item recommendation includes a portion of the set of candidate items.

3. The method of claim 2, further comprising:

ranking the one or more candidate items according to a context boosting factor, the context boosting factor being based on the one or more keywords; and selecting the portion of the set of candidate items based on the ranking.

4. The method of claim 1, wherein the generating of the item feature vector includes:

obtaining item attributes of the item from inventory data, wherein the item attributes include a title and a category; and using the item attributes to generate the item feature vector.

5. The method of claim 1, wherein the selecting of the one or more cluster expressions includes identifying a context boosting factor using the item feature vector and the query feature vector, wherein the one or more cluster expression are retrieved based on the context boosting factor.

6. The method of claim 5, wherein the identifying the context boosting factor includes identifying a set of item attributes that are common to the item feature vector and the query feature vector.

7. The method of claim 5, further comprising:

ranking the set of candidate items in accordance with the context boosting factor; and selecting the at least one item from the set of candidate items based on the ranking.

8. The method of claim 1, wherein the retrieving of the set of candidate items includes:

creating recall expressions using the one or more clusters expressions; and identifying the set of candidate items using the recall expressions.

9. The method of claim 1, wherein the causing presentation of the item includes causing presentation of a product details page corresponding to the item, and wherein the alternative item recommendation includes a product details page corresponding to an alternative item.

10. A system comprising:

an interface module configured to receive a search query from a client device, the search query including one or more keywords, the interface module further configured to receive, from the client device, a request to view an item included in a set of search results retrieved in response to the search query;

a cluster assignment module configured to:

generate an item feature vector corresponding to the item, the item feature vector including a first plurality of attribute value pairs, generate a query feature vector corresponding to the search query, the query feature vector including a second plurality of attribute value pairs, identify, from a plurality of item clusters, one or more item clusters based on the item feature vector, each of the plurality of item clusters having at least one corresponding cluster expression, and select one or more cluster expressions from the one or more item clusters based on the item feature vector and the query feature vector, each of the one or more cluster expressions defining a corresponding item cluster and including a set of attribute value pairs that describe items in the corresponding item cluster;

an item retrieval module, comprising one or more processors, to retrieve one or more candidate items based on the one or more cluster expressions the item retrieval module further configured to select a portion of the one or more candidate items for inclusion in an alternative item recommendation; t the interface module is further configured to cause presentation, on the client device, of a user interface displaying the item and the alternative item recommendation.

11. The system of claim 10, wherein the item retrieval module is further configured to:

rank the one or more candidate items according to a context boosting factor, the context boosting factor being based on the one or more keywords; and selecting the portion of the set of candidate items based on the ranking.

12. The system of claim 10, wherein the cluster assignment module is configured to generate the item feature vector by performing operations comprising:

obtaining item attributes of the item from inventory data, wherein the item attributes include a title and a category; and using the item attributes to generate the item feature vector.

13. The system of claim 10, wherein the cluster assignment module is configured to select the one or more cluster expressions by performing operations comprising identifying a context boosting factor using the item feature vector and the query feature vector, wherein the cluster assignment module retrieves the one or more cluster expression based on the context boosting factor.

14. The system of claim 13, wherein the cluster assignment module is configured to identify the context boosting factor by identifying a set of item attributes that are common to the item feature vector and the query feature vector.

15. The system of claim 13, wherein the item retrieval module is further configured to:

rank the set of candidate items in accordance with the context boosting factor; and select the portion of the set of candidate items based on the ranking.

16. The system of claim 10, wherein the cluster assignment module is configured to identify the set of candidate items by performing operations including:

creating recall expressions using the one or more clusters expressions; and identifying the set of candidate items using the recall expressions.

17. The system of claim 10, wherein the presentation of the item includes presentation of a product details page corresponding to the item, and wherein presentation of the alternative item recommendation includes a product details page corresponding to an alternative item.

18. A non-transitory machine-readable storage medium embodying instructions that, when executed by a machine, cause the machine to perform operations comprising:

receiving a search query from a client device, the search query including one or more keywords;
providing a set of search results to the client device;
receiving, form the client device, a request to view an item included in a set of search results retrieved in response to the search query;
determining an alternative item recommendation using the one or more keywords of the search query and one or more attributes of the item, the alternative item recommendation including at least one other item that is similar to the item, wherein determining the alternative item recommendation comprises:
generating an item feature vector corresponding to the item, the item feature vector including a first plurality of attribute value pairs;
generating a query feature vector corresponding to the search query, the query feature vector including a second plurality of attribute value pairs;
identifying, from a plurality of item clusters, one or more item clusters based on the item feature vector, each of the plurality of item clusters having at least one corresponding cluster expression; and
selecting one or more cluster expressions from the one or more item clusters based on the item feature vector and the query feature vector, each of the one or more cluster expressions including a set of attribute value pairs that describe items in a corresponding cluster; and
retrieving a set of candidate items based on the one or more cluster expressions, wherein the alternative item recommendation includes at least one item from the set of candidate items; and
in response to receiving the request to view the item, causing presentation, on the client device, of the item and the alternative item recommendation.

* * * * *